Oct. 9, 1962     J. BRATUN     3,057,143
WINDROWER
Filed Feb. 4, 1960     3 Sheets-Sheet 1
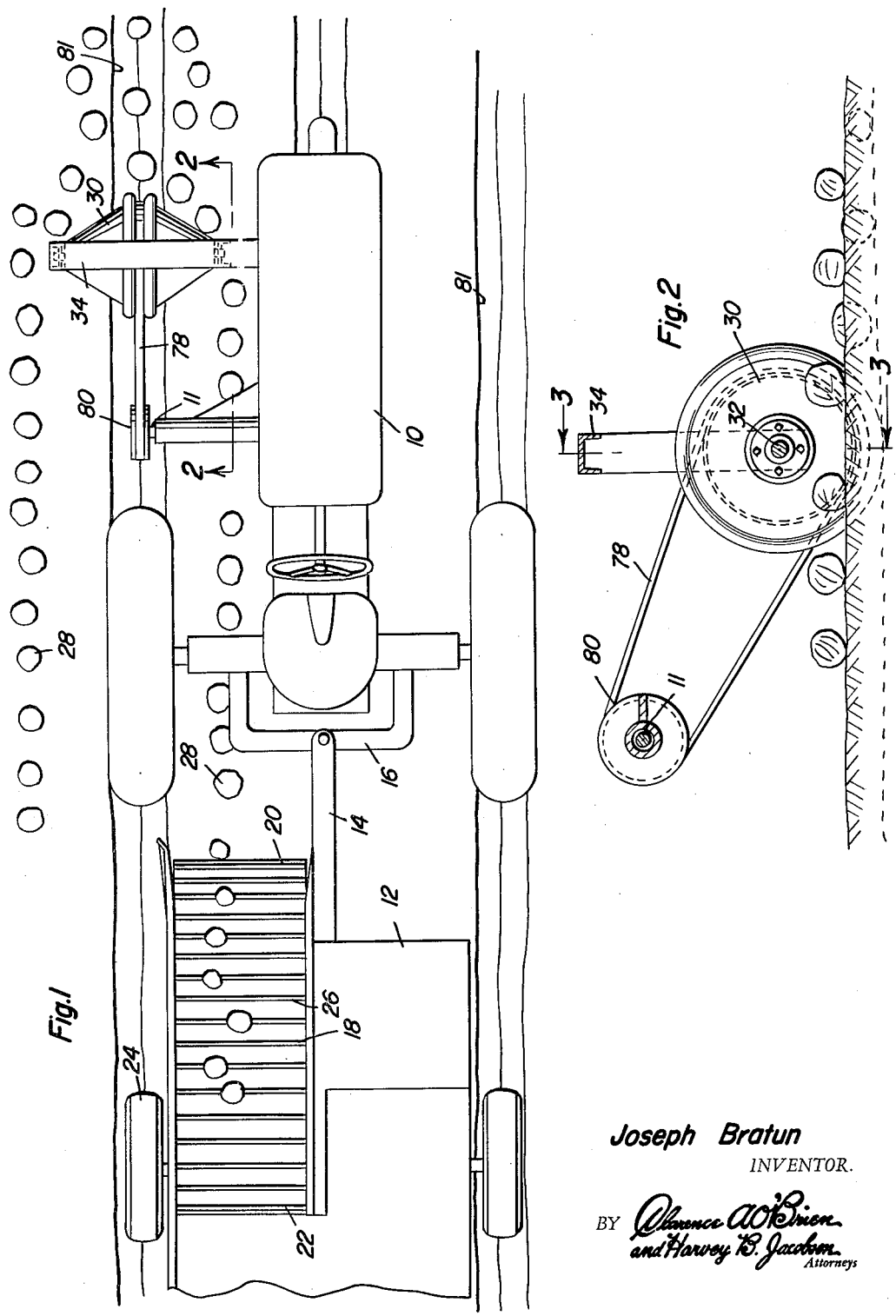
Joseph Bratun
INVENTOR.
BY *Clarence A. O'Brien*
and *Harvey B. Jacobson*
Attorneys Oct. 9, 1962 J. BRATUN 3,057,143
WINDROWER
Filed Feb. 4, 1960 3 Sheets-Sheet 2

Joseph Bratun
INVENTOR.

BY Clarence A.O'Brien
and Harvey B. Jacobson
Attorneys

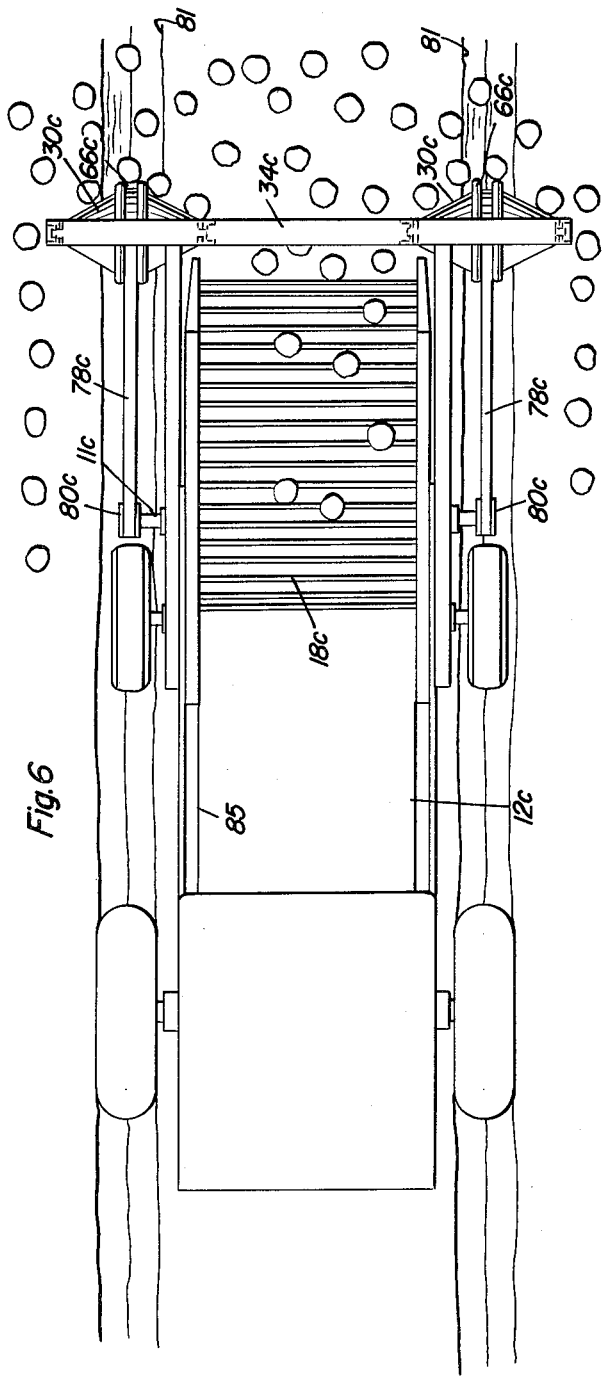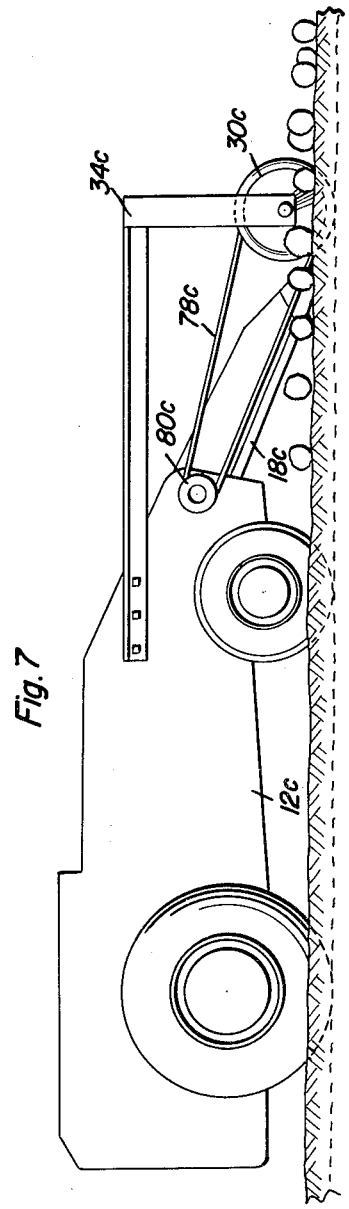

United States Patent Office 3,057,143
Patented Oct. 9, 1962

3,057,143
WINDROWER
Joseph Bratun, Rte. 1, Box 660, Pueblo, Colo.
Filed Feb. 4, 1960, Ser. No. 6,711
7 Claims. (Cl. 56—345)

This invention relates to agricultural equipment and more particularly to a windrower for produce such as and/or vegetables.

An object of the invention is to provide a windrower to facilitate harvesting of crops, the windrower capable of moving fruits or vegetables in a windrow for gathering the same by machine i.e. by the use of a tractor or by the use of a self-propelled vehicle.

One of the advantages of the invention is that all of the fruits or vegetables are gathered, and there is little or no incidence of fruit or vegetable damage.

A problem existing in mechanical gathering of fruits and vegetables comes about because of the rain troughs in the field. Fruits and vegetables gather in these troughs and they are difficult to pick up. The windrower in accordance with the invention has a specifically designed wheel or drum which urges the fruit gently from the rain furrows or troughs, pushing them both to the left and to the right or in some instances only to the left or only to the right. Consequently, a tractor or a self-propelled vehicle may ride along the field with the wheel in the rain troughs with assurance that the fruits or vegetables are removed therefrom.

In moving the vegetables from the troughs, they are rather neatly windrowed so that a trailing vehicle in the case of a tractor drawn machine, easily gathers them. In the case of a unitized self-propelled vehicle, the windrow that is formed by one or more of the special drums or wheels, is also gathered.

Although both fruits and vegetables are mentioned, it is evident that the principles of the invention are applicable to all crops wherein there is a need and possible use for the invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top view of a windrower constructed in accordance with the invention, this view showing the windrower in use.

FIGURE 2 is an enlarged sectional view taken on the line 2—2 of FIGURE 1.

FIGURE 6 is a top view showing a self-propelled form of gathering vehicle with which the windrower is associated.

FIGURE 7 is a side elevational view of the windrower in FIGURE 6.

Figure 3:
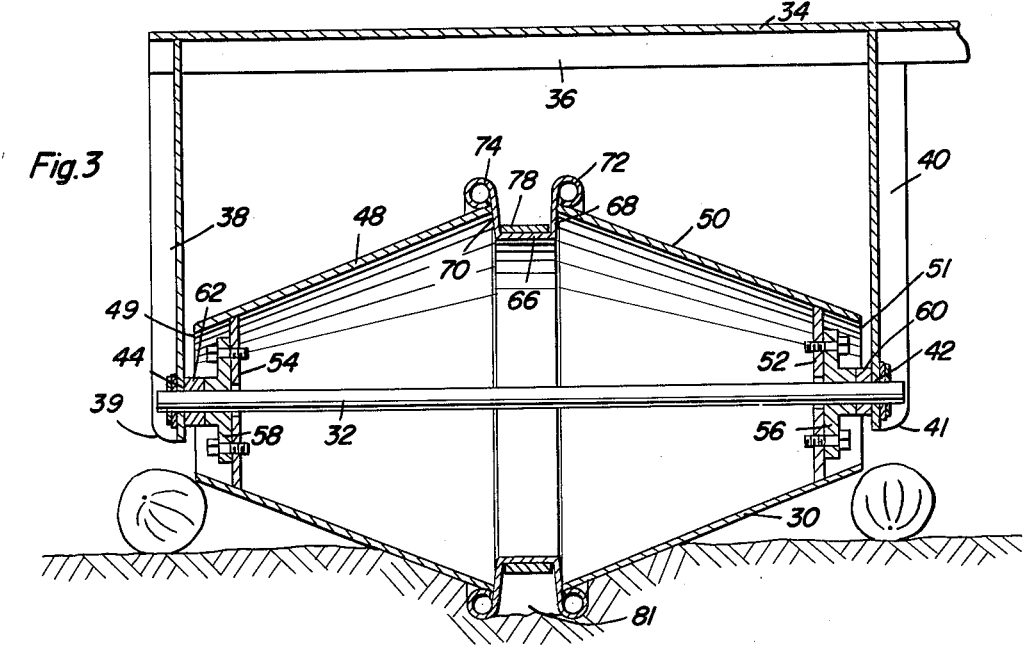
FIGURE 3 is an enlarged sectional view taken on the line 3—3 of FIGURE 2.

In the accompanying drawings reference is first made to FIGURES 1–4. The tractor 10 diagrammatically represents any manufacturer's make or style of tractor capable of drawing vehicle 12. Vehicle 12 is a wagon or cart having a tongue 14 attached to the drawbar 16 of the tractor and pulled behind the tractor. The chassis of vehicle 12 has a source of power (not shown) to operate gathering conveyor 18 which is inclined from the lower front end 20 thereof to the upper rear end 22 thereof. Any source of power may be used, for instance an engine, power derived from the power take-off of the tractor or by direct drive from one of the wheels 24 of the vehicle 12 to one of the rollers of the endless conveyor 18 or other such arrangements that may be adopted from the prior art for which reason they are not being illustrated since the specific powering arrangement per se forms no part of the invention. There are slats 26 extending transversely across and constituting a part of the conveyor in order to facilitate gathering fruits, vegetables or the like which are in a windrow 28 in advance of the inlet end 20 of the conveyor.

A special drum or wheel 30 is mounted for rotation on a spindle or axle 32 supported by lateral frame 34 connected with the tractor 12, for example to the front or side drawbar thereof. Frame 34 is made of an upper horizontal frame member 36 having two vertical depending frame members 38 and 40 spaced from each other and fixed to upper frame member 36. The axle 32 extends across frame members 38 and 40 and is mounted for rotation in bearings 42 and 44 at the lower extremities 39 and 41 of frame members 40 and 38.

Drum 30 is symmetrical about a longitudinal and a transverse plane passing therethrough. It is composed of two joined sections 48 and 50 having smooth continuous external surfaces, each section being of truncated conical shape with the smaller diameter end 49 and 51 having end plates 52 and 54 fixed thereto and inset slightly from the ends 49 and 51. Plates 52 and 54 support hubs 56 and 58 which are bolted or otherwise secured on the outer faces thereof. The hubs have axle 32 extending therethrough, and there are spacers 60 and 62 on the axle 32 and located between hubs 56, 58 and bearings 42, 44.

At the juncture of the wider diameter portions of the sections 48 and 50 there is a cylindrical pulley 66 formed by a narrow cylindrical wall and two side walls 68 and 70 joined to the edges of hub 56 and protruding beyond the perimeters of the wider diameter ends of sections 48 and 50. Circular tubes 72 and 74 are formed at the outer extremities of walls 68 and 70, and these are ground engaging members.

The pulley 66 has a belt 78 entrained thereover, and the belt is entrained over a drive pulley 80 which is attached to the power take-off 11 of tractor 10. Consequently, the wheel or drum 30 is rotated in a direction opposite to the rotation of the wheels of the tractor as the tractor is propelled forward. The shape of the wheel or drum 30 which has been specifically described above, is of importance since the wider diameter part of the wheel 30 rests in the rain trough 81 while the wheels of the tractor ride in the same rain trough but behind wheel 30.

In use, the wheel 30 is rotated by power taken from the power take-off of the tractor as the tractor is propelled forward in the field with the wheels of the tractor in the rain troughs 81. The rotation of drum or wheel 30 gently pushes the fruits or vegetables out of the rain trough, forming them into a pair of windrows 28, one windrow on each side of the rain trough within which the wheel 30 is operable. Since there is a fruit or vegetable gathering vehicle 12 trailing the tractor, the fruits or vegetables which are neatly placed in a windrow are automatically gathered immediately after they are placed in the windrow.

Figure 5:
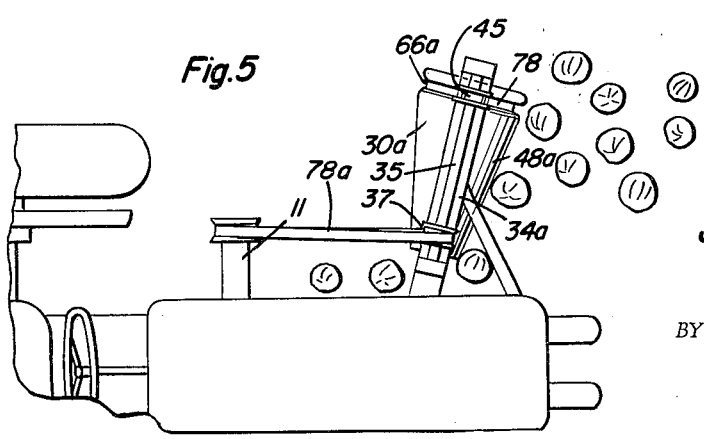
FIGURE 5 is a fragmentary top view of a modified form of the invention.

FIGURE 5 shows a modification wherein the wheel or drum 30a is truncated. One section, for instance section 50 is removed, leaving only section 48a and the pulley 66a. Further, FIGURE 5 shows that the wheel 30a may be made elongate and of course, should it be desired, the proportions of the wheel may be varied in the opposite sense i.e. the wheel shortened in comparison to its diameter as a logical outgrowth of the present exemplary illustration. Further, FIGURE 5 shows the support frame 34a at an angle with respect to a plane passing transversely across the longitudinal axis of the tractor, this showing that the windrower may be used on the surface and need not necessarily be restricted to use within in a rain trough. The drive for the wheel 30a from power take-off 11 is therefore effected through drive belts 78a and 78 drivingly interconnected by shaft 35 which is rotatably mounted above the frame 34a and has pulleys 37 and 45 connected to opposite ends thereof. The belt 78 accordingly is entrained about pulleys 45 and 66a.

Figure 4:
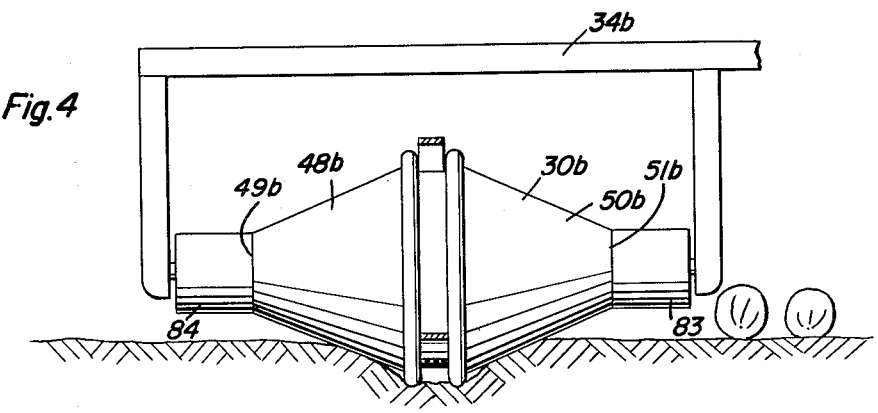
FIGURE 4 is a front elevational view of a modified portion of the windrower of FIGURES 1 through 3.

FIGURE 4 shows a further modification. Frame 34b is the same as frame 34, but wheel or drum 30b is modified to the extent that sections 48b and 50b have comparatively large diameter spindles in the form of hollow cylinders 83 and 84 attached to the smaller diameter ends 49b and 51b of the truncated conical sections 48b and 50b. A number of other configurations may be resorted to, those described above being merely for exemplifying the principles of the invention. It is to be noted that apart from the features specifically discussed above, the functional utility and structural organization of drum or wheel 30b is the same as that of wheel 30.

Reference is now made to FIGURES 6 and 7. In this form of the invention the gathering vehicle 12c is a self-propelled vehicle as opposed to a drawn vehicle 12 in FIGURE 1. Consequently, there is no need for a tractor. Instead, the chassis 85 of vehicle 12c is equipped with a gathering conveyor 18c. The power take-off 11c is double-ended and there are two drive pulleys 80c with which drive belts 78c are engaged. The drive belts are entrained over pulleys 66c of the two drums or wheels 30c that are mounted laterally of chassis 85 and that are supported by a single transverse frame 34c attached to chassis 12c at the front thereof. In the use of this form of the invention the vehicle 12c services two rain troughs 81 simultaneously and forms three windrows, one between troughs 81 and the other two on the outer sides thereof. The windrow between troughs 81 is gathered by means of the gathering conveyor 18c as the vehicle 12c moves forward in a field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. For instance, the rotary drums described herein may be used to make furrows or ditches in the field for row crop irrigation. The most practical arrangement would be with the drum or drums mounted on a tractor or implement.

What is claimed as new is as follows:

1. In an agricultural machine, a windrower comprising a wheel having a truncated conical section, an axle supporting said section for rotational movement, a pulley connected with said truncated conical section at a wider diameter portion thereof and adapted to be rotated, thereby rotating the truncated conical section of the wheel to push fruits and vegetables into a windrow for subsequent gathering, a vehicle having a gathering conveyor located behind said wheel, said gathering conveyor having a lower front end into which the fruits and vegetables are adapted to be received, a second truncated conical section extending from said pulley and coaxial with the first mentioned truncated conical section, and ground engaging means flanking said pulley and adapted to seat in a rain trough to move fruits and vegetables therefrom.

2. The subject matter of claim 1 wherein said ground engaging means consists of a pair of spaced rings on opposite sides of the pulley and at the larger diameter portion of each of said truncated conical sections.

3. In combination with a vehicle propelled by traction wheels, a windrower comprising, frame means mounted on the vehicle, smooth surface wheel means rotatably mounted by the frame means for rotation about an axis extending transversely to a forward direction of movement of the vehicle and operative to laterally deflect produce engaged therewith without damage thereto, means operatively connected to the wheel means for imparting rotation thereto and initially engaging and displacing produce lying in furrows formed by said traction wheels for subsequent deflection by the wheel means to one axial end thereof, said last mentioned means comprising ground furrow engaging means connected to the wheel means and pulley means defined therein for imparting rotation to the wheel means, said wheel means comprising axle means supported by the frame means and conical produce engaging surface means rotatably mounted on the axle means, said ground furrow engaging means connected to a wider diameter portion of the conical surface means, said conical surface means comprises truncated conical sections disposed on opposite axial sides of said furrow means.

4. The combination of claim 3, wherein said furrow engaging means comprises a pair of parallel spaced annular tube members connected to the wheel means, said pulley means being formed between the spaced tube members.

5. In combination with a vehicle propelled by traction wheels, a windrower comprising, frame means mounted on the vehicle, smooth surface wheel means rotatably mounted by the frame means for rotation about an axis extending transversely to a forward direction of movement of the vehicle and operative to laterally deflect produce engaged therewith without damage thereto, means operatively connected to the wheel means for imparting rotation thereto and initially engaging and displacing produce lying in furrows formed by said traction wheels for subsequent deflection by the wheel means to one axial end thereof, gathering conveyor means mounted on the vehicle rearwardly of the wheel means and offset with respect thereto toward said one axial end thereof for receiving produce windrowed by the wheel means, said means operatively connected to the wheel means comprising ground furrowing engaging means connected to the wheel means and pulley means defined therein for imparting rotation to the wheel means, said furrow engaging means being disposed in alignment with the vehicle traction wheels for gently removing produce lying in furrows in advance of the traction wheels for subsequent windrowing by the smooth surface wheel means, said furrow engaging means comprising a pair of parallel spaced annular tube members connected to the wheel means, said pulley means being formed between the spaced tube members.

6. The combination of claim 5, wherein said wheel means comprises axle means supported by the frame means and conical produce engaging surface means rotatably mounted on the axle means.

7. The combination of claim 6, wherein said ground furrow engaging means is connected to a wider diameter portion of the conical surface means.

References Cited in the file of this patent

UNITED STATES PATENTS

| | | |
|---|---|---|
| 478,442 | Livingston | July 5, 1892 |
| 1,715,218 | Wright et al. | May 28, 1929 |
| 1,877,770 | Larson | Sept. 20, 1932 |
| 2,543,324 | Marsh | Feb. 27, 1951 |
| 2,654,209 | Raney et al. | Oct. 6, 1953 |
| 2,845,769 | Hintz et al. | Aug. 5, 1958 |